United States Patent

[11] 3,620,672

| [72] | Inventor | Algirdas C. Poshkus<br>Lancaster, Pa. |
|---|---|---|
| [21] | Appl. No. | 753,747 |
| [22] | Filed | Aug. 19, 1968 |
| [45] | Patented | Nov. 16, 1971 |
| [73] | Assignee | Armstrong Cork Company<br>Lancaster, Pa. |

[54] METHOD OF PREPARING ANHYDROUS PHOSPHORUS ACID
4 Claims, No Drawings

[52] U.S. Cl. .................................................. 23/165,
260/682
[51] Int. Cl. ................................................. C01b 25/16,
C07c 1/20
[50] Field of Search ........................................... 23/165;
260/682

[56] References Cited
UNITED STATES PATENTS

| 2,908,708 | 10/1959 | Beach .......................... | 260/978 |
| 2,908,709 | 10/1959 | Beach .......................... | 260/976 |

OTHER REFERENCES

Kosolapoff, " Organo-Phosphorus Compounds," 1950, pages 180– 184

Thorpe et al., " Journal of the Chemical Society," Vol. 57, pages 634– 636 (1890)

Primary Examiner—M. Weissman
Attorney—William G. Taylor

ABSTRACT: Anhydrous phosphorous acid may be readily prepared by thermolizing dialkyl hydrogen phosphites at temperatures less than 220° C. in accordance with the equation:

$$(RO)_2PHO \rightarrow 2R_{-H} + H_3PO_3$$

In the formulas set forth, R is an alkyl group of from two to eight carbon atoms.

METHOD OF PREPARING ANHYDROUS PHOSPHORUS ACID

BACKGROUND OF THE INVENTION

1. Field of the Invention

This invention relates to a simple and economical synthesis of anhydrous phosphorous acid.

2. Description of the Prior Art

Phosphorous acid is available commercially as 30 percent and 70 percent aqueous solutions. It is produced by hydrolyzing phosphorous trichloride with water. In order to produce the anhydrous acid or remove chlorine contaminants, long tedious procedures are involved. Conventional methods of preparation are described in Inorganic Synthesis, volume 4, edited by J. C. Bailar, Jr., copyright 1953 by McGraw-Hill Book Company at page 55.

SUMMARY OF THE INVENTION

I have discovered that dialkyl hydrogen phosphites, other than dimethyl hydrogen phosphite, thermolize readily into an olefin and phosphorous acid at temperatures less than 220° C. Yields and conversions are quantitative and, since the olefin distills out of the reaction mixture, the product remaining is phosphorous acid.

DESCRIPTION OF THE PREFERRED EMBODIMENTS

The dialkyl hydrogen phosphites, with which this invention is concerned, are easily prepared by reacting phosphorous trichloride with the desired alcohol to form the corresponding dialkyl hydrogen phosphite which is readily purified by distillation. [Houben-Weyl-Muller: Methoden der Organischen Chemie. Vol. 12, Part 2, p. 20] The alkyl halide by product may be readily collected and stored or converted to the required alcohol. The thus-prepared dialkyl hydrogen phosphite may be readily thermolized into an olefin and phosphorous acid at temperatures less than 220° C., the reaction usually being complete within 5 hours and usually within 1 hour. If the mixture is heated for some time above 220° C., some phosphoric acid is produced due to oxidative disproportionation.

The procedure for producing phosphorous acid is general to the alkyl homologs other than dimethyl hydrogen phosphite. Diethyl hydrogen phosphite gives small amounts of ether in addition to ethylene but the higher alkyl homologs produce no ethers. The process is amenable to continuous large-scale operations for producing anhydrous phosphorous acid free from arsenic and chlorine contaminants and the following reaction scheme is involved:

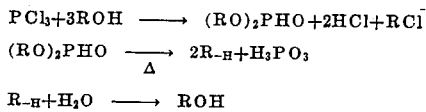

The phosphorous acid thus prepared is a valuable intermediate for making phosphorous compounds. It reacts with olefins and acetanilides, carbonylic compounds, ketenes, isocyanates, acid anhydrides, and anils to give plasticizers, fire retardants, and other products. Its salts are used as stabilizers for poly (vinyl chloride) resins and other chlorinated hydrocarbons.

The following examples illustrate specific embodiments of my invention.

EXAMPLE 1

1. Thermolysis of Diisopropyl Hydrogen Phosphite

Freshly distilled diisopropyl hydrogen phosphite (166.0 grams) was refluxed and the pot temperature allowed to rise up to 210° C. over a period of 4 hours. Propylene (boiling point of −50° C.; 118 ml.) was collected in a dry-ice trap. The clear liquid flask contents solidified. Yield of white crystalline product was in the amount of 80.2 grams (a 98 percent yield), the white crystalline phosphorous acid having a melting point range of from 65° to 70° C.

EXAMPLE 2

2. Thermolysis of Dibutyl Hydrogen Phosphite

Dibutyl hydrogen phosphite (97 g.) was refluxed under a condenser connected in sequence to an ice trap, dry-ice temp., calcium chloride tube and a Nujol bubbler. The pot temperature was raised slowly (5 hrs.) to 246° C. When liquid began to collect in the dry-ice trap, the temperature was dropped to 240° and heating continued for two additional hours to collect a total of 72 g. of clear colorless liquid identified as a mixture of butenes by boiling point, infrared spectrum and bromination to dibromides. On the bases of infrared spectrum, we estimate the composition of butene to be 1-butene: cis-2-butene: trans.-2-butene as 1:1:0.5. The ice trap contained 10 ml. of an unidentified liquid.

The clear colorless pot contents slowly solidified and melted at 65–70. It was somewhat hygroscopic and gave anilinium slats insoluable in ether.

EXAMPLE 3

3. Thermolysis of Bis (2-ethylhexyl) Hydrogen Phosphite

Bis(2-ethylhexyl) hydrogen phosphite (289 g.; 0.94 mole) was heated at 200°–210° for 2 hours in a distillation apparatus; 199 g. (88 percent yield) of 2-ethyl-1-hexene was collected. The clear water-white pot contents was phosphorous acid and suitable for use as an intermediate.

I claim:

1. The method of producing anhydrous phosphorous acid comprising thermolyzing a dialkyl hydrogen phosphite of the formula $(RO)_2PHO$, wherein R is an alkyl radical of from two to eight carbon atoms, by refulxing said dialkyl hydrogen phosphite at a temperature less than about 240° C. and separating the phosphorous acid thus formed by distilling off the olefin by product.

2. The method in accordance with claim 1 in which the dialkyl hydrogen phosphite is diisopropyl hydrogen phosphite.

3. The method in accordance with claim 1 in which the dialkyl hydrogen phosphite is dibutyl hydrogen phosphite.

4. The method in accordance with claim 1 in which the dialkyl hydrogen phosphite is bis(2-ethylhexyl) hydrogen phosphite.